United States Patent
Sciammarella et al.

(10) Patent No.: US 12,436,498 B1
(45) Date of Patent: Oct. 7, 2025

(54) SYSTEM AND METHOD FOR CAPTURING AND ANALYZING MICROSCALE AND NANOSCALE DIGITAL HOLOGRAMS

(71) Applicants: Eduardo A. Sciammarella, Fallbrook, CA (US); Cesar A. Sciammarella, Chicago, IL (US); Luciano Lamberti, Bari (IT)

(72) Inventors: Eduardo A. Sciammarella, Fallbrook, CA (US); Cesar A. Sciammarella, Chicago, IL (US); Luciano Lamberti, Bari (IT)

(*) Notice: Subject to any disclaimer, the term of this patent is extended or adjusted under 35 U.S.C. 154(b) by 0 days.

(21) Appl. No.: 18/936,292

(22) Filed: Nov. 4, 2024

Related U.S. Application Data

(60) Provisional application No. 63/546,942, filed on Nov. 2, 2023.

(51) Int. Cl.
| | |
|---|---|
| *G03H 1/00* | (2006.01) |
| *G02B 21/26* | (2006.01) |
| *G02B 21/36* | (2006.01) |
| *G03H 1/04* | (2006.01) |

(52) U.S. Cl.
CPC ........... *G03H 1/0005* (2013.01); *G02B 21/26* (2013.01); *G02B 21/365* (2013.01); *G03H 1/0443* (2013.01); *G03H 2001/005* (2013.01); *G03H 2210/55* (2013.01); *G03H 2222/12* (2013.01); *G03H 2222/31* (2013.01); *G03H 2223/23* (2013.01)

(58) Field of Classification Search
CPC ............... G03H 1/0005; G03H 1/0443; G03H 2001/005; G03H 2210/55; G03H 2222/12; G03H 2222/31; G03H 2223/23; G02B 21/26; G02B 21/365
USPC ......................................................... 348/40
See application file for complete search history.

(56) References Cited

U.S. PATENT DOCUMENTS

| | | | | |
|---|---|---|---|---|
| 7,812,959 | B1* | 10/2010 | Kim ...................... | G03H 1/0408 356/458 |
| 10,989,724 | B1* | 4/2021 | Holmes .................. | G01N 35/10 |
| 12,332,419 | B2* | 6/2025 | Zakaria .................. | G02B 21/06 |
| 2014/0234949 | A1* | 8/2014 | Wasson ................. | B01L 3/0275 422/519 |

* cited by examiner

*Primary Examiner* — Marnie A Matt
(74) *Attorney, Agent, or Firm* — Plager Schack LLP; Mark H. Plager; Alexis Saenz

(57) ABSTRACT

A microscopy system and method use super-resolution to generate the equivalent of a digital holographic image. Through super-resolution, images of nanoscale sized objects may be captured without interrupting the object (for example, a virus) or the object's environment. The information gathered through super-resolution techniques may be transformed into holographic replications of the object which may be analyzed with greater accuracy of the object.

6 Claims, 9 Drawing Sheets

SYSTEM AND METHOD FOR CAPTURING AND ANALYZING MICROSCALE AND NANOSCALE DIGITAL HOLOGRAMS

CROSS-REFERENCE TO RELATED APPLICATIONS

This application claims benefit under 35 U.S.C. § 119 (e) of U.S. Provisional Application having Ser. No. 63/546,942 filed Nov. 2, 2023, which is hereby incorporated by reference herein in its entirety.

BACKGROUND

The embodiments herein relate generally to optical systems, and more particularly, to a system and method for capturing and analyzing microscale and nanoscale digital holograms.

Electron transmission microscopy (TEM) can achieve a resolution limit on the angstrom scale, and an X-ray microscope can reach a resolution of about 10 nm. However, using these instruments on biological samples comes with serious environmental restrictions. For instance, the SARS-COV-2 virus, which causes COVID-19, must be frozen at extremely low temperatures to be viewed with TEM. Dynamic pictures from TEM have played a significant role in the vaccine development strategy. Still, they require expensive and complex equipment due to spatial and time resolution issues (the size of the virus is approximately 100 nm). Optical near-field scanning microscopes and atomic microscopes can reach resolutions of 0.1 nm but pose the difficulty in that they require step by step probes whose interaction with biological materials is the source of many problems.

SUMMARY

In one aspect of the subject technology, a digital holographic optical microscope system for nanoscale imaging is disclosed. The system includes a microscope. A camera sensor is coupled to the microscope and positioned to capture images of objects within the field of view of an objective on the microscope. A first optical grating is positioned within the field of view of the microscope. A microscope slide holding a sample specimen is adjacent the first optical grating. The microscope slide and the first optical grating meet at a first interface. A second optical grating is positioned on a side of the microscope slide opposite the first optical grating. The microscope slide and the second optical grating meet at a second interface. A light source is positioned to illuminate the field of view of the microscope. A first pumped laser and polarized output is pointed at the first interface. A critical angle of incidence of the first pumped laser and polarized output on the first interface is greater than a critical angle of the first interface. A second pumped laser and polarized output is pointed at the second interface. A critical angle of incidence of the second pumped laser and polarized output on the second interface is greater than a critical angle of the second interface. A motorized stage supports the first optical grating, the microscope slide, and the second optical grating. In addition, an interface control system is coupled to the motorized stage and the camera sensor. The interface control system includes a computing device configured to: control a movement of the motorized stage to position the microscope slide and sample specimen within a plurality of adjusted positions within the field of view of the microscope, receive image data from one or more evanescent wavefronts in images captured by the camera sensor, interpret the image data using a Moiré holographic analysis, reconstruct a three-dimensional image of the interpreted image data run a prediction engine on the three-dimensional image, and identify features in the sample specimen using the prediction engine.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Overview

Figure 1:
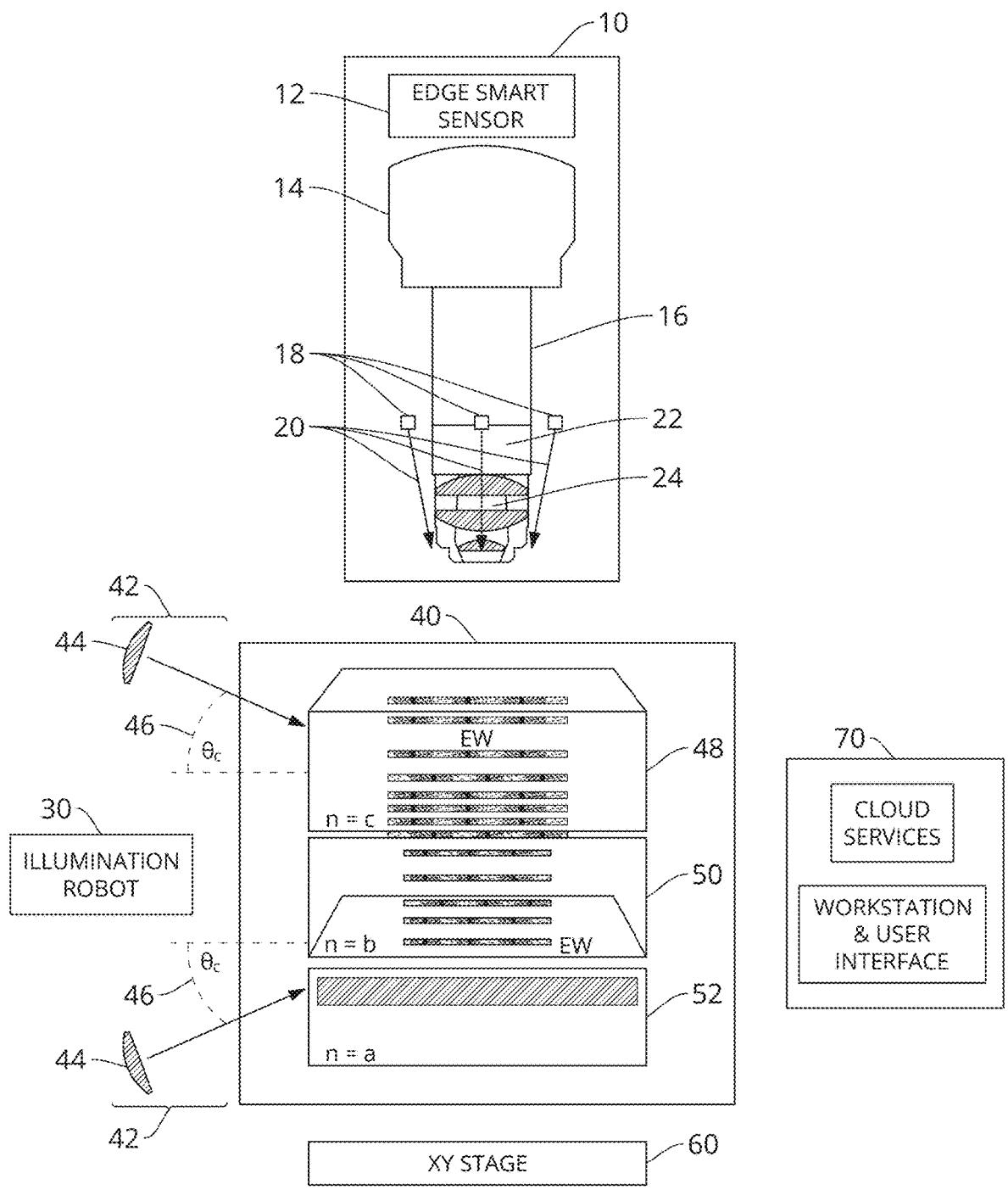
FIG. 1 is a block diagram of a microscopy system in accordance with an embodiment of the subject technology.

Broadly, embodiments of the subject technology provide a digital holographic optical microscope that may observe nanoscale viruses, for example, the family of coronaviruses under environmental conditions similar to those that the viruses operate in. Embodiments disclosed herein provide advancements in optical super-resolution technology, particularly in the field of measurement instruments and nano microscopes. The device has been created using a combination of various techniques, including Moiré-Holography, Evanescent Illumination, Broad Brillouin Scattering, and Super Resolution. A method using the subject device is referred to as Digital Holographic Optical Moiré microscopy (DHOM). Aspects of the microscope will provide dynamic observations under normal environmental conditions, an extremely valuable feature that will be useful in the fight against nano viruses. One benefit that will be seen is that the DHOM system enables label-free imaging simply using light as a probe. This should substantially reduce sample preparation time and research discovery cycles.

In one aspect of the subject technology, a digital holographic optical microscope system for nanoscale imaging is disclosed. The system includes a microscope. A camera sensor is coupled to the microscope and positioned to capture images of objects within the field of view of an objective on the microscope. A first optical grating for reflection is positioned within the field of view of the microscope. A microscope slide holding a sample specimen is adjacent the first optical grating. The microscope slide and the first optical grating meet at a first interface. A second optical grating for transmission is positioned on a side of the microscope slide opposite the first optical grating. The microscope slide and the second optical grating meet at a second interface. The setup consists of a double interface that creates an optical resonator, specifically a Fabry-Pérot resonator, producing various frequency resonances. A "resonator" as used herein, refers to any interface that produces optical resonance. For example, the sample/grating interface may be the most critical, and the focus of discussion. However, other interfaces may be a "resonator" within the scope of the subject technology. For example, a transparent plate. such as a semiconductor can be focused on the top and bottom sides at different times if they are both in contact with a grating with each side's interface defining an instance of a "resonator".

A light source is positioned to illuminate the field of view of the microscope. A first pumped laser and polarized output is pointed at the first interface. Instead of the traditional evanescent field, the light wavefronts decay in a specific way. In this regime, all frequencies generated stay within the cavity and can be detected with a high-resolution camera sensor. The light that is received by the microscope is not the light of the illuminating laser beam but is the light emitted by the observed object as a result of the effect of the illuminating laser beam, i.e., the evanescent illumination and the complex solutions of the Maxwell equations introduced by Toraldo di Francia in the early 1940's. The evanescent illumination occurs at the interface of each media when the angle of an incident beam is equal or greater than that of total internal reflection (TIR). The method comprises and wherein projecting an optical Fourier transform image of the nano size structures via a relay lens on a focal plane of the relay lens, focusing the Fourier transform image on a sensor array of the digital camera, processing the focused Fourier transform image via the computer system.

A motorized stage supports the first optical grating, the microscope slide, and the second optical grating. In addition, an interface control system is coupled to the motorized stage and the camera sensor. The interface control system includes a computing device configured to: control a movement of the motorized stage to position the microscope slide and sample specimen within a plurality of adjusted positions within the field of view of the microscope, receive image data from one or more evanescent wavefronts in images captured by the camera sensor, interpret the image data using a Moiré holographic analysis, reconstruct three-dimensional geometry and stress/strain data of the sample, feed data to run a prediction engine on the three-dimensional and stress/strain data, and identify the sample specimen using the prediction engine.

The DHOM system includes two techniques to improve resolution: optical and numerical super-resolution. These first technique is based on theorems of analytic functions. By expanding the higher-order Fourier Transform of the images of nano-objects from a known region to the entire domain, higher resolution can be achieved using the subject device and methods. The maximum spatial frequency, fmx, of a captured image, determines the resolution that can be attained. The optical system described is utilized to improve the sensitivity from $\lambda/2$ (diffraction limit) to $\lambda/160$. To achieve this task a carrier gratings have been introduced in the optical system. These carrier gratings provide pitches in the nanometric range that make feasible the recovery of information even in the sub-nanometric scale. A grating illuminated by an evanescent field of light has not only discrete diffraction order but also imaginary orders that are defined by complex sines. The following equation is obtained for the orders of diffraction of a grating including the complex orders.

$$\sin_n = \frac{n_o}{n_{so}}$$

$$c\frac{\lambda}{n_{so}\frac{p_o}{N}}$$

The first term correspond to the discrete real orders, the second term corresponds to the complex sine orders. As shown in FIG. 1 the complex sine orders are generated when the angle of the illuminating laser light is the total reflection angle $\theta_c$ or larger with respect to the normal to the plane of the grating.

The second technique In our study, we implemented a pipeline to enhance image resolution, consisting of four primary stages: analysis, noise reduction, sharpening, and upscaling. We employed object detection and segmentation models, such as YOLO and U-Net, to analyze image content, particularly edges and key features, guiding subsequent sharpening efforts. In the noise reduction stage, models like denoising auto-encoders were utilized to minimize noise while preserving important image details. The sharpening phase then applied edge-enhancing neural networks, including ESRGAN, to amplify edge contrast and clarity, improving the perceptual sharpness of the image. For the upscaling stage, we utilized deep learning-based models like SRGAN to predict and generate new pixels, enabling high-quality resolution enhancement up to six times the original size. Finally, a post-upscaling cleanup phase was introduced to mitigate potential artifacts, ensuring the preservation of image integrity across all stages. This approach allowed for the efficient generation of high-resolution images suitable for detailed scientific analysis and restoration purposes.

Software is incorporated into a pipeline that connects image capture, analysis, and visualization. The software is utilized to analyze the geometric information, extract the internal residual stress and strain data related to formation or fabrication of the sample, and verify the accuracy of measurements and benchmarks for A.I. software pipeline visual representations. Phase retrieval algorithms can reconstruct images from Fourier Transform frequencies fs≤fmx. The frequency fmx that can be recorded depends on the camera sensor's configuration, the sensor's size, the number of pixels, and pixel size. Numerical super-resolution uses bicubic interpolation to enhance the resolution of pixels to sub-pixel levels extending, when feasible, the range of frequencies. "Feasible" means the field is smooth enough to satisfy the theorems of continuity of analytic functions. Given the vast amounts of data that can be captured to achieve a desired outcome, DHOM's effectiveness in real-time research and industrial applications benefits from A.I. workflows. The DHOM system provides the software platform to support these analytic and A.I. workflows and the efficient storage and retrieval of information from the computer and cloud. The entire system may be operated from a read-eval-print loop (REPL) user interface running in a web browser and using APIs between hardware and software service workers.

System

Referring now to FIG. 1, a digital holographic optical microscope system is shown that includes an illumination sub-system 10. The system contains a laser source (not shown) that is connected to one or more fiber optic cables, which produces an illumination beam(s) out of fiber optic lenses 20. In one embodiment, a laser diode (not shown) produces a laser light beam, which is maintained at a constant intensity output by a stabilization circuit. The laser light beam is then focused by one or more lenses and received by a connector that interfaces with the fiber optic cable. The fiber optic cable generates the illumination beam as an output seen out of elements lens elements 20.

A lens coupling device (not shown) may be mounted on a computer-controlled motorized rotator of a robot (not shown), which receives the illumination beam and selectively steers the beam's angle. The beam rotator (which may be circular-shaped) may be mounted on a computer-controlled X, Y, Z micro-translation stage 60 that translates movement in nanometric resolution in the X, Y, Z directions.

The sub-system 10 includes an edge sensor 12 and a camera sensor 14 positioned to capture images of a specimen illuminated by the output of the laser source. The camera sensor 14 may be coupled to an infinity corrected tube microscope 16. The microscope 16 may include a z stage element 22. An objective 24 may be coupled with the z stage element 22.

The field of view seen through the objective 24 may be pointed toward a sample microenvironment 40 that holds a sample on a microscope slide 50 with sample control. In the following disclosure, a sample may be any material but for sake of illustration, a diamond semiconductor wafer is one example of material that benefits from the subject technology. The microenvironment 40 may include an optical grating 48 positioned over the microscope slide 50 area. A doped optical grating 52 may be positioned behind the slide 50. Some embodiments include pumped laser excitation sources 42 pointed at the optical grating 48. The output of laser excitation sources 42 may be directed using polarizers 44 set at an incident angle 46. Some embodiments include an illumination robot 30. An interface control and analysis station 70 including a computing device, may be connected peripherally to the sub-system 10, sample microenvironment 40, and micro-translation stage 60 to control illumination, movement of the sample under illumination, and analysis of captured imagery.

The following is a general operation of the system shown in FIG. 1 to produce total internal reflection in an optical grating by directing a laser at a specimen. More detailed descriptions of processes are shown in the subsequent figures. The laser source(s) may be directed at a specific angle in relation to the top, bottom, and sides of a small target specimen. The laser wave may be adjusted to be elliptically polarized as it enters the specimen. The DHOM system may operate under various laser frequencies, including those in the ultraviolet, visible, and near-infrared range, with wavelengths ranging from 200 to approximately 1200 nm. The theory of super resolution applies to a wide range of electromagnetic and mechanical waves. Super resolution affects the interface where the optical grating 48 and target specimen come into contact. The target specimen on the microscope slide 50 and the optical grating 48 are positioned in the basic configuration. The optical system can adjust the vertical and horizontal position of the grating 48 with respect to the specimen. The grating's position may be controlled by a computerized motorized actuator via the micro-translation stage 60 and the interface station 70. The laser illumination system may also be motorized and may be aimed using computer control in any direction, including above, below, around, and parallel to the specimen and grating. To aim the laser in the basic configuration, a semi-circular prism may be used to change the angle of illumination. The prism may be supported by an X, Y, Z translation stage. As shown FIG. 1, the total internal reflection generates an evanescent wavefront (EW) at the boundary of media.

The optical grating 48 used in the system may be a Ronchi ruling, but in other embodiments, a blazed grating may be used. The Ronchi ruling is the optical circuit's fundamental component that captures the observed object's information. In one embodiment, a computer-controlled structured Moiré laser projection may be used as a replacement for a physical optical grating or in addition to a physical optical grating. Structured projection Moiré from four directions, top, bottom, left, and right, enhances the directional 3D resolution of the captured image by the DHOM camera sensor. In another embodiment, optical gratings may be stacked or made of optical metamaterials to optimize the optical circuit to the geometry of the nano-target.

The target specimen may be located at the interface of at least two media. This boundary condition can naturally occur in a single glass prism that has a silver metallic surface coating or a microscope slide where there is a transition from one medium to another. A glass microscope slide 50 with a depression well filled with molecular water creates the necessary boundary conditions for Evanescent Illumination EIL, as the light is traveling from a medium with a higher index of refraction of the glass to a medium with a lower index of refraction for the water EIL and Broadened Brillouin Scattering (BBS) is an extension of Brillouin scattering. BBS is different from other forms of light scattering because it is associated with two phenomena: ion movement in dielectric materials due to electrostriction, and the material's pseudo-crystalline structure due to the photoelastic effect caused by local states of stress. BBS conditions are met. Within the interface region of the boundary, a nano-sized target object may be excited by an EIL wavefront, producing eigenmodes of vibration. Ultrasound waves (phonons) provide energy to the electromagnetic field (photons). The nano object emits BBS-structured light wavefronts that are recorded by the camera in the Digital Moiré Holographic (DHOM) system.

In a primary set-up, the interface (glass-air and air-metal) creates an optical resonator, for example, a Fabry-Perot resonator, producing various frequency resonances. This regime is not the one defined in evanescent waves, causing the evanescent wavefronts to decay with distance from the interface. When operating in the Fabry-Perot regime, all frequencies generated are within the cavity and may be detected with a sufficient spatial resolution camera sensor. These frequencies may be retrieved using the fast Fourier transform (FFT) of captured images. In certain applications of the super-resolution microscope, a ball lens is added to the Fabry-Perot optical circuit as a relay lens for collecting information on observed objects at a small point from a wide field of view.

BBS is an extension of the theory of Brillouin scattering. Brillouin scattering deals with crystalline lattices. BBS also occurs at the interface of two media of different indices of refraction. The BBS process outlined in this disclosure is the generalization of that theory to any kind of medium, gas, liquid, or solid and is done by replacing the discontinuous matter with the continuum approach of physics. A DHOM instrument and method can measure targets in a wide range of environmental conditions and physical operating ranges with wide latitudes in pressure and temperature. The method has been proven in transmission, reflection, surface characterization, bulk characterization, and deflection.

The MHO wavefronts pass through a microscope objective and an infinity-corrected microscope optical relay. This process allows the digital microscope to capture the signal and generate the equivalent of a digital holographic image. The camera may be connected to a desktop computer with a display screen. The MHO wavefronts assist in capturing the intensity and phase of wavefronts, much like holography. The advantage of this method is that the method can produce high-resolution images (via software) without being affected by background noise. The Moiré carrier fringes contain the properties of the observed objects. A digital microscope records the signal and outputs a digital sample image. The MHO records the intensity and phase of wavefronts. As will be appreciated, the device and method of image capture achieve high resolution (via software) without being extremely sensitive to ambient noise. The observed objects' properties are encoded through Moiré carrier fringes.

Four factors may be used to determine camera resolution for the subject device and method: 1. magnification, 2. field of view, 3. camera sensor size, 4. number of pixels of sensor. Utilizing interpolation procedures, it is possible to arrive at a sensitivity that can reach $\frac{1}{100}$ of the resolution of the camera.

The elevated levels of spatial resolution obtained are attributed to Super-resolution SR Imaginary harmonics present in the diffraction patterns of gratings encode local information in carrier fringes and propagate to the far field, where they can be recorded. Additionally, SR allows the utilization of local phases and amplitudes by reducing the footprint of the evanescent wavefronts on the camera sensor.

SR records and analyzes data using software. In gratings, imaginary harmonics present in diffraction patterns encode local information in carrier fringes, which propagate from the near field to the far field for recording. SR reduces the footprint of evanescent wavefronts on the camera sensor, making it possible to utilize local phases and amplitude concepts.

There are several parallel workflows involved in analyzing and representing information. Software embodiments may represent data in various formats, such as 2D images, 3D geometry, stress and strain fields, heat maps, A.I. representations, plots, and a collection of analytic pipelines for common problem sets.

As a general operation, laser enters optical circuit at critical angle. A condition of total internal reflection is achieved in the optical cavity. An evanescent wavefront is generated in the optical resonator of the system. Photons interact with the resonator and target to generate ultrasound waves. The ultrasound waves vibrate the sample specimen target. Due to the vibration of the sample target it self-illuminates. A camera sensor within the optical circuit records the self-illumination. A series of algorithms are applied to un-wrap the final image and calculate measurements. Details of the above high-level operation are provided below in the example methods.

Methodology

Figure 2:
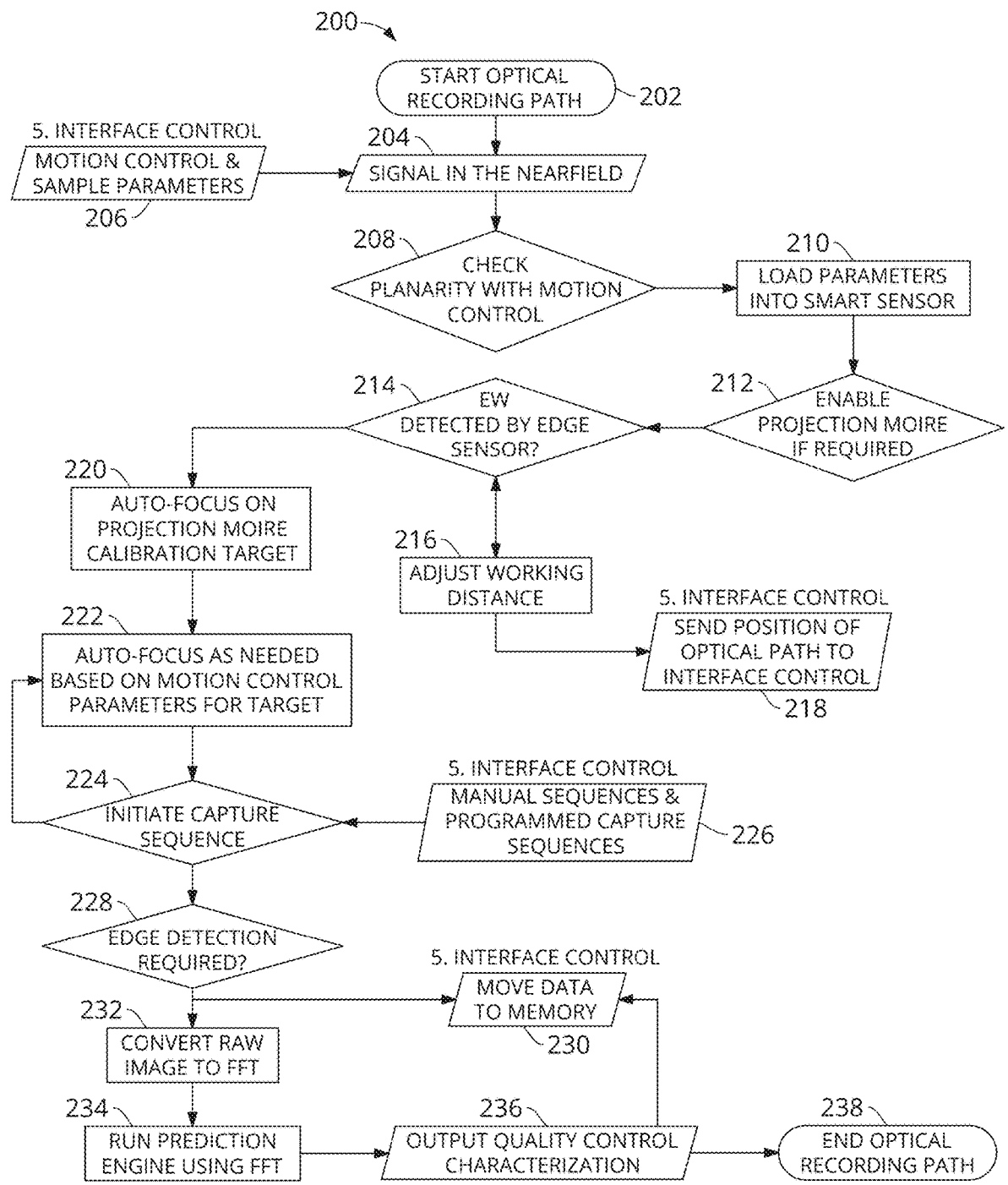
FIG. 2 is a flow chart of the optical sub-system recording path in accordance with an embodiment of the subject technology.
Figure 7A:
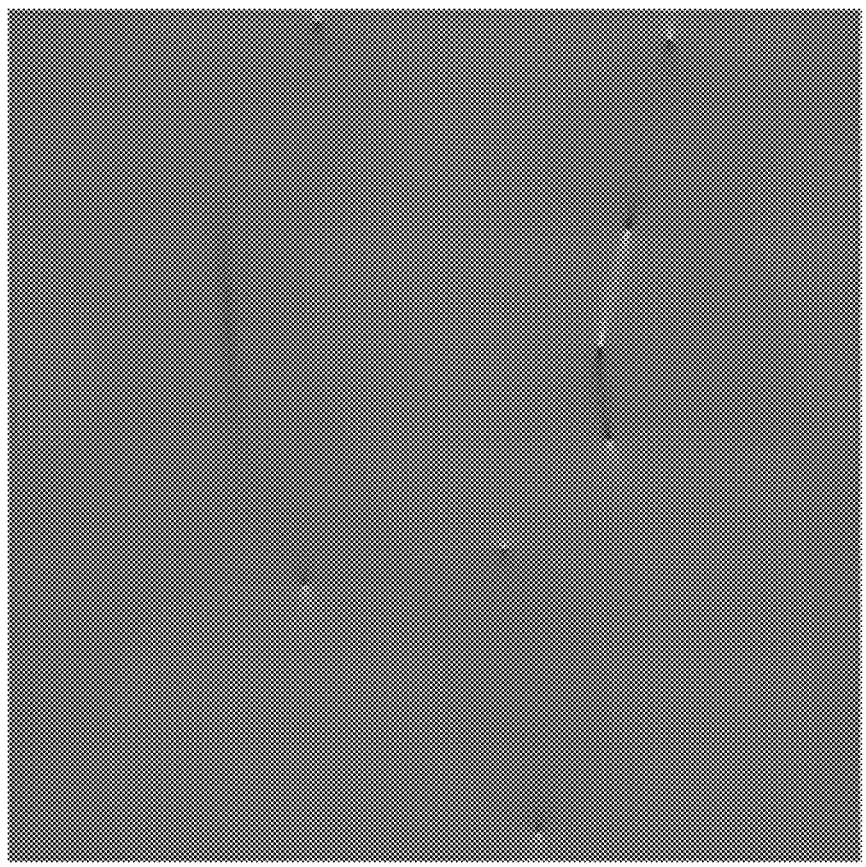
FIGS. 7A-7C are a series of screenshots of images using artificial intelligence based quality control on a diamond semiconductor wafer, consistent with embodiments of the subject technology.
Figure 7B:
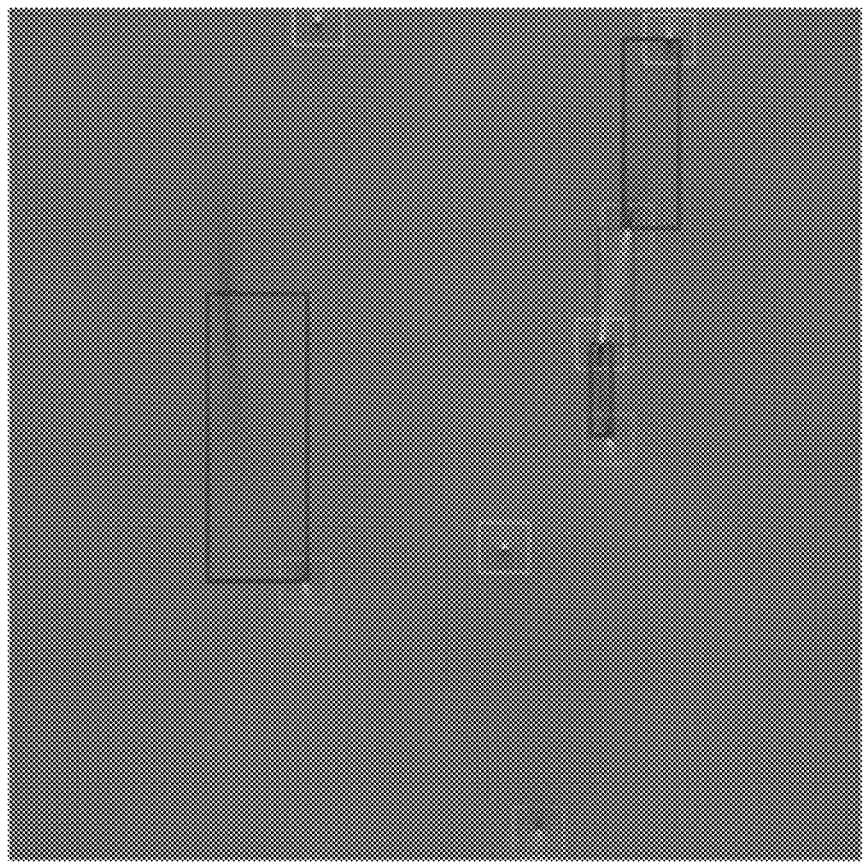
Figure 7C:
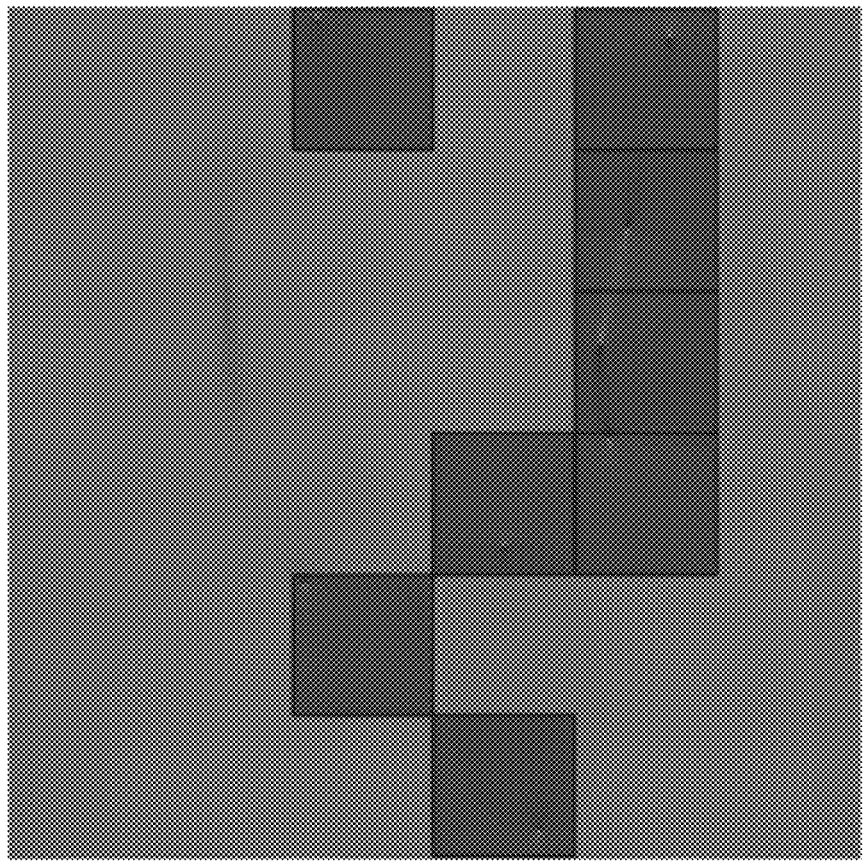

FIG. 2 shows a method 200 for generating an optical recording path according to an embodiment. As mentioned above, many materials may be subjected to the subject methodology, however for sake of illustration a diamond semiconductor wafer is the example sample/specimen under image capture. In block 202, the optical recording path aimed at the sample is started. In block 204 the signal in the near field is captured. In some environments the interface control may set motion control and sample parameters in block 206 that are applied to the signal in the near field. In block 208, planarity with motion control is checked. In block 210, parameters are loaded into the smart sensor. In block 212, a determination of whether a Moiré projection is required may be made. In block 214, a determination may be made to see whether an evanescent wavefront (EW) at the interface with the specimen is detected by the edge sensor. If undetected, the working distance of the objective may be adjusted (block 216). Adjustments to the working distance may be forwarded to the interface control station as a parameter in tracking the position of the optical path and associated elements. If the EW is detected, in block 220, the system control may calibrate the auto-focus on the Moiré projection of the specimen target. Once the specimen is in focus, in block 224, the sequence for capturing images of the specimen may be initiated. An example of a specimen image is shown in FIG. 7A. In some embodiments, the interface control may be either manually controlled or programmed controlled to capture sequences (block 226). The step of auto-focusing may continuously adjusted after each capture if needed. In block 228, the system may determine whether edge detection is required. If edge detection is not required, the method may proceed to block 230. If edge detection is needed, then in block 232, raw captured images of the specimen may be converted into fast Fourier Transform (FFT) data. In block 234, a prediction engine is operated using the FFT data to predict the type and amount of certain features on a wafer surface. FIG. 7B shows an image of features on the specimen identified by the system's processor. The main goal of wafer analysis is to maximize the conductivity of diamond wafers, and NF serves as a supporting discipline that provides means to verify the optimization process. The goal of the prediction engine is to select large-size diamond wafers that are dislocation-free. For example, Micropipes are considered to be empty-core screw dislocations with large strain energy. NF is a methodology used to verify and optimize the conductivity of diamonds as semiconductors. For example, A.I. analysis can be trained on the geometry of dislocation types in the captured images for fast identification of specimens. In block 236, quality control characterization is output. The characterization includes bending analysis of the plate, surface roughness characterization, 3D contour, and stress and strain field. FIG. 7C shows an image of dislocations identified by A.I. engine. The output may be sent to memory of the interface control (block 230). In block 238, the optical recording path process terminates.

Figure 3:
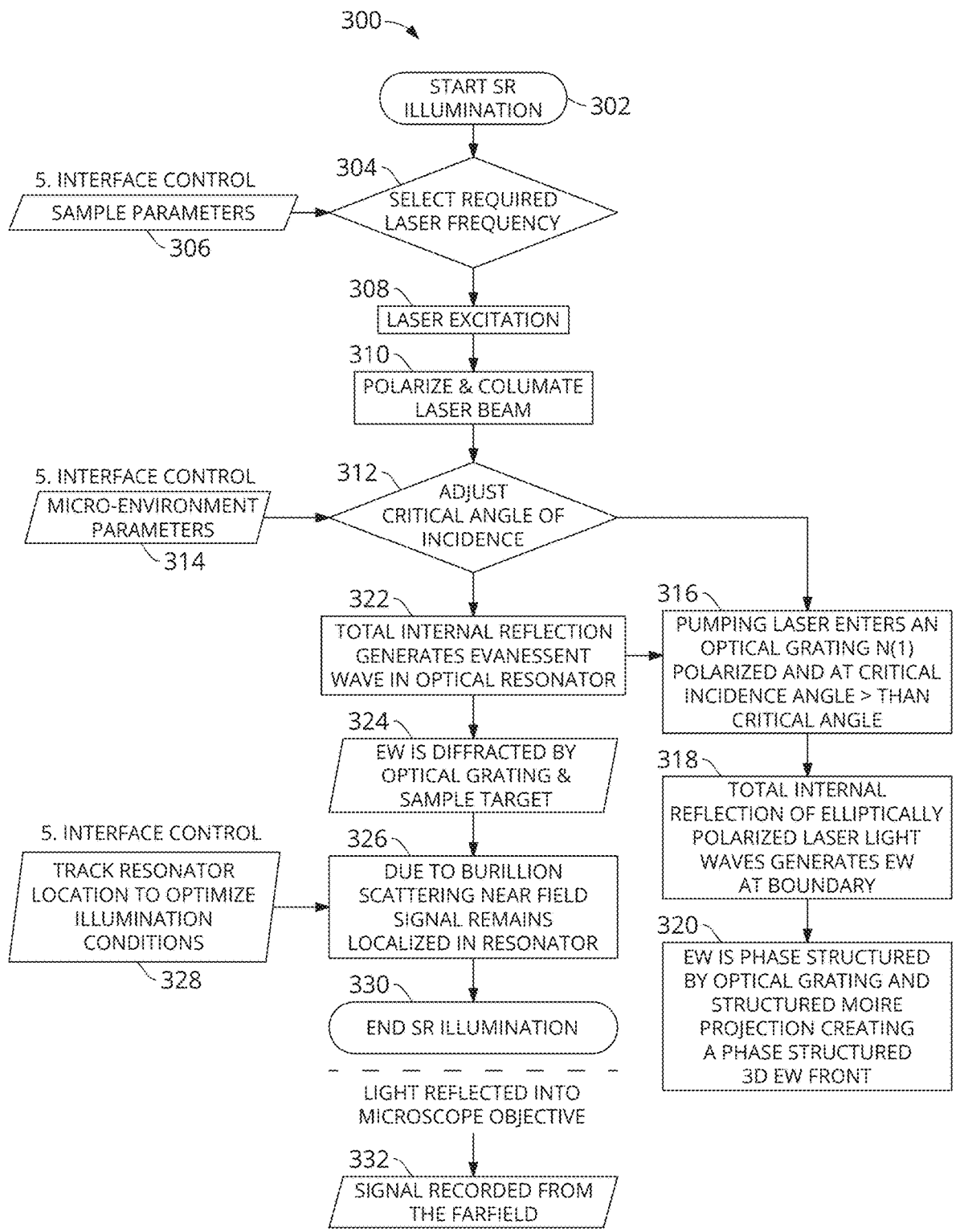
FIG. 3 is a flow chart of the illumination robot and optical resonator in accordance with an embodiment of the subject technology.

FIG. 3 shows a method 300 of capturing a nanoscale specimen signal according to an embodiment. In block 302, SR illumination is started. The laser frequency may be selected in block 304. In some embodiments, the frequency is based on sample parameters received by the interface control (block 306). A laser is operated in block 308 at the previously selected frequency. In block 310, the laser beam generated may be polarized and/or columnated. The critical angle of incidence is adjusted as needed in block 312. The critical angle may be a micro-environment parameter stored in the interface control (block 314).

In some embodiments, the laser is pumped, entering an optical grating polarized at a critical angle of incidence that is greater than the critical angle (block 316). In block 318, the total internal reflection of elliptically polarized laser light generates an evanescent wavefront at the boundary between a sample and optical grating whether, on top or bottom. There can be multiple EIL resonators in a single optical setup and the camera maybe focus on different interfaces in the setup as needed for the information. In block 320, the evanescent wavefront is phase structured by the optical grating and structured Moiré projection creating a phase structured three-dimensional evanescent wavefront, which represents the reconstructed 3D image of the object captured in the image. The EIL contains the self-illumination wavefronts from the nano objects, The wavefronts are pseudo crystals/Eigen modes, transmitted through the physics of ç scattering and Brillouin scattering and the higher order harmonics as described.

In block 322, after the critical angle of incidence of the laser is adjusted (block 312), the evanescent wavefront is diffracted by the interface of the optical grating and the sample target. In block 326, due to Brillouin scattering, the near field signal remains localized in a resonator. In some embodiments, the interface control may track the resonator location to optimize illumination conditions (block 328). In block 330, the SR illumination may end. The light that is reflected into the microscope objective may be recorded as the far field signal in block 332.

Figure 4:
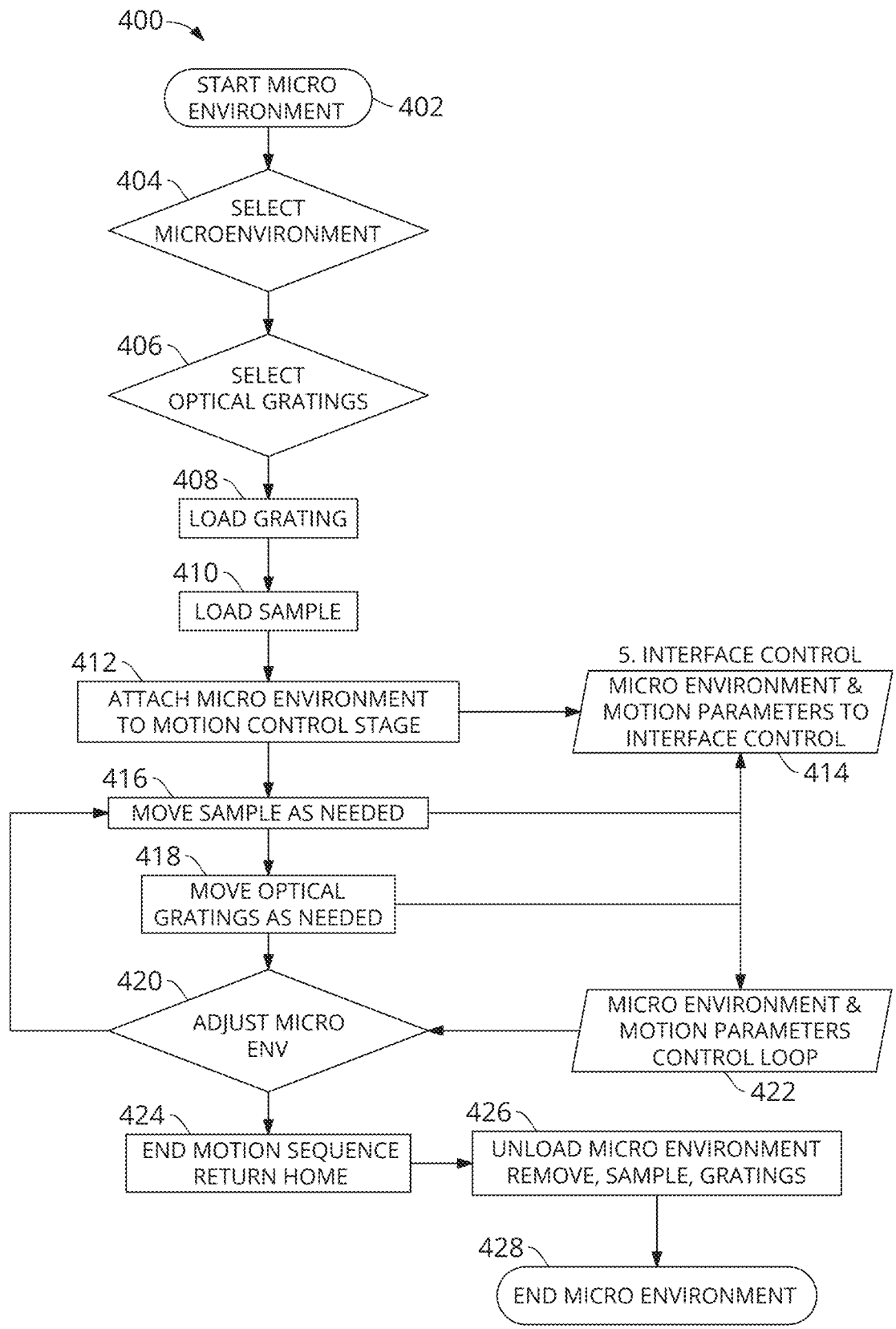
FIG. 4 is a flow chart of the sample microenvironment and motion control in accordance with an embodiment of the subject technology.

FIG. 4 shows a method 400 of preparing and controlling a microenvironment for capturing images of a nanoscale specimen, according to an embodiment. In block 402, the microenvironment staging process starts. In block 404, a microenvironment is selected (for example, air only, liquid only, doped, not doped, etc.). In block 406, one or more optical gratings are selected. In block 408, the optical grating(s) is loaded into the microenvironment. In block 410, the sample is loaded into the microenvironment. In block 412, the microenvironment is attached to a motion control stage. In some embodiments, the interface control may control the motion control stage based on user input or pre-programmed parameters (block 414). In block 416, the motion control stage may be operated to move the sample into view as needed. In block 418, the optical gratin(s) may be moved as needed, for example, by a programmed robot. In block 420, the microenvironment may be adjusted (for example, for pressure, temperature, and/or electrical potential). The interface control may be used to automatically adjust the microenvironment using motion parameters and a control loop program (block 422). In block 424, the motion sequence may be ended. In block 426, the microenvironment, sample, and gratings may be removed from the system. The microenvironment preparation may end in block 428.

Figure 5:
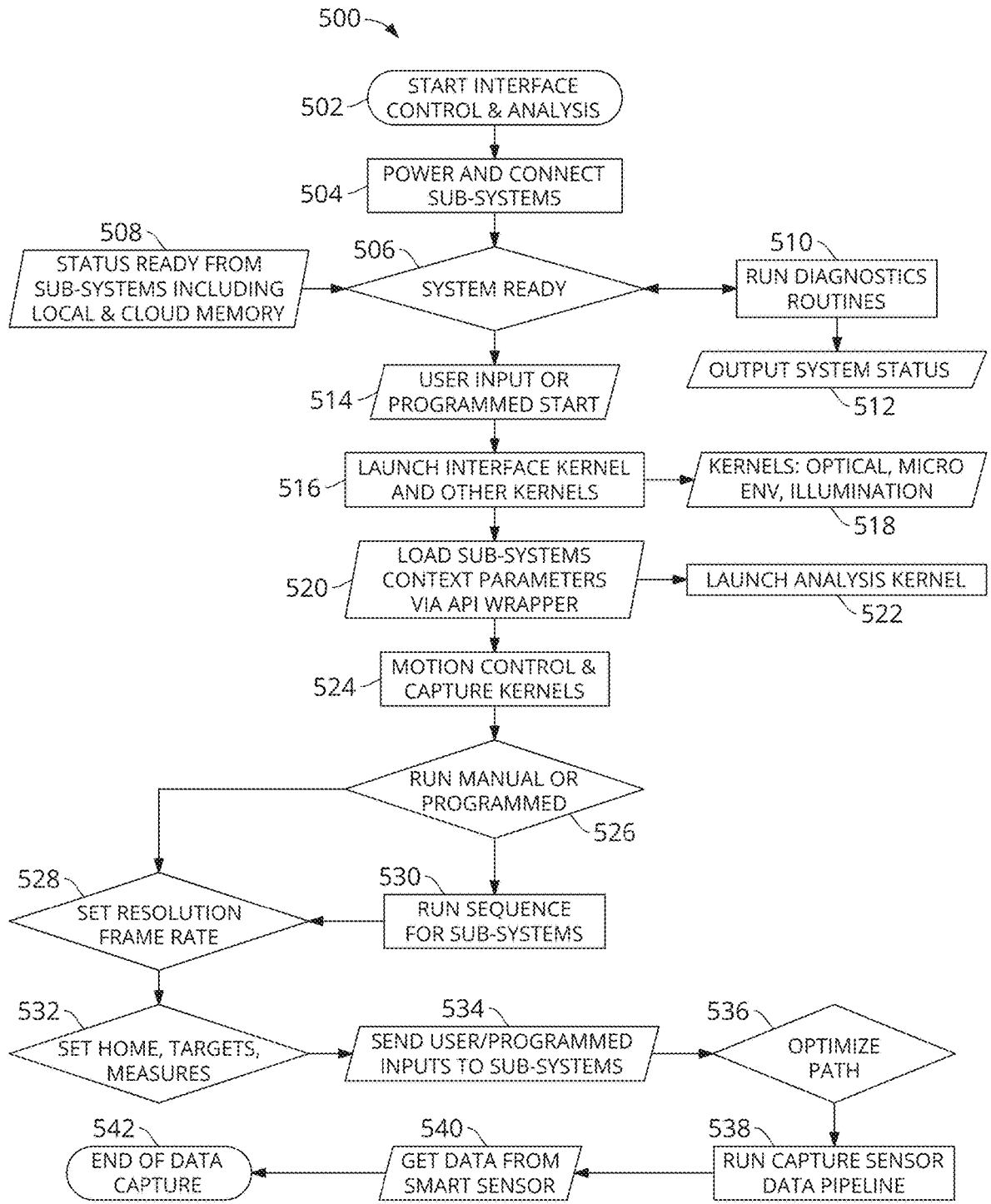
FIG. 5 is a flow chart of the interface control in accordance with an embodiment of the subject technology.

FIG. 5 shows a method 500 of operating a digital holographic optical microscope (DOHM) system interface control for analysis of a nanoscale specimen. At block 502, the interface control and analysis process begins. In block 504, the DOHM, the interface control, and sub-systems are powered on. In some embodiments, a ready status signal may be received by sub-systems indicating readiness to proceed. When the system is ready (block 506), in some embodiments, a diagnostics routine may be run first at block 510. The system status may be output at block 512 after diagnostics are run. In block 514, a user input or pre-programmed setting starts the analysis process. In block 516, kernels may be launched. In block 520, sub-systems context parameters may be loaded via an application program interface wrapper. In block 522, some embodiments may launch an analysis kernel. In block 526, settings/parameters may be manually entered or programmed into the interface control module. In block 530, the sequence for sub-systems is commenced. In block 528, a resolution frame rate may be set for capturing images of the sample. In block 532, a home location, targets, and measures may be set into the interface control. In block 534, the user input or programmed settings may be sent to sub-systems. In block 536, the optical path for capturing an image on a sample may be optimized. In block 538, the sensor data pipeline capture sequence may be run. In block 540, data from the smart sensor may be received. In block 542, data capture may terminate.

Figure 6:
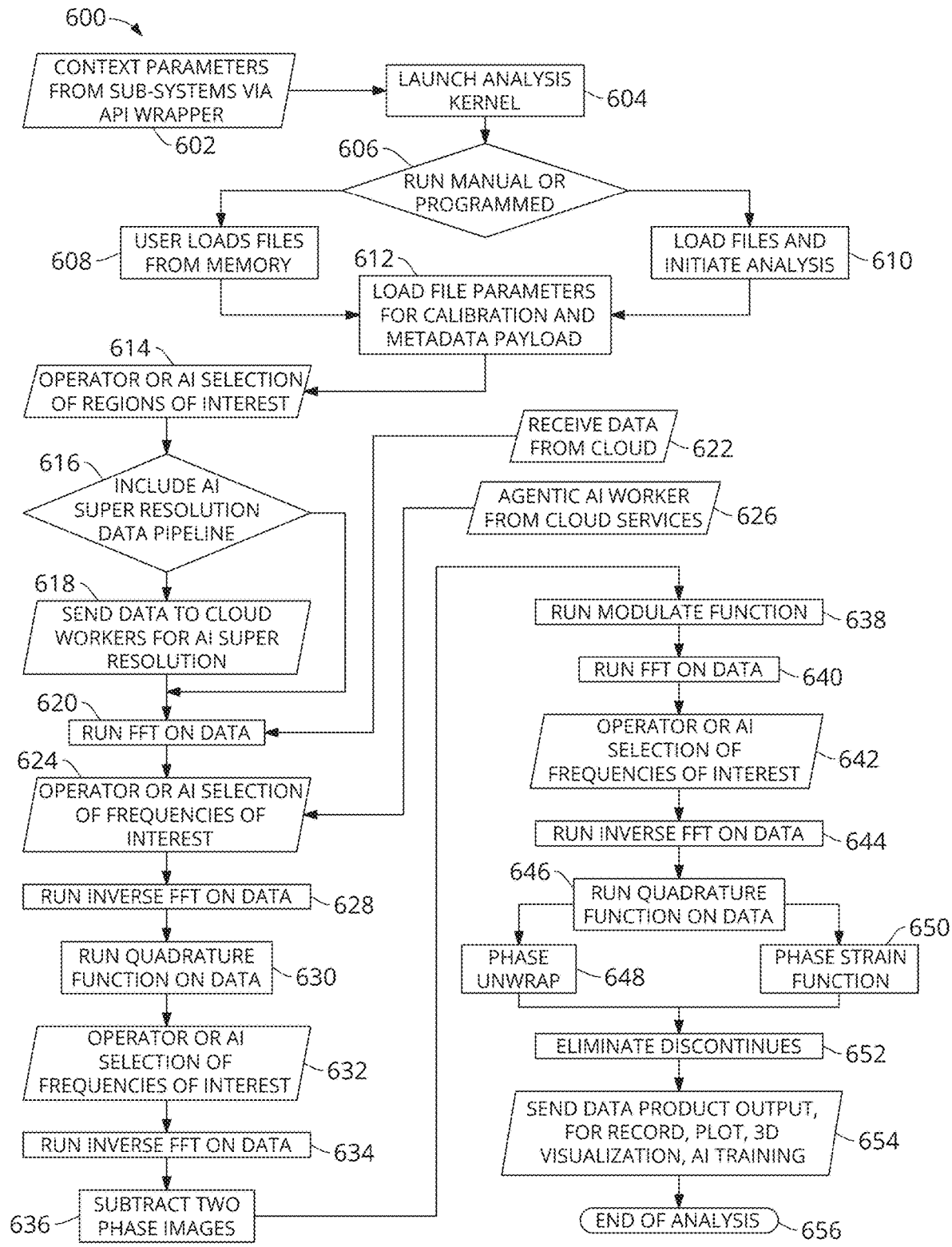
FIG. 6 is a flow chart of the analysis computer in accordance with an embodiment of the subject technology.

FIG. 6 shows a method 600 of performing analysis on a nanoscale specimen sample using a DHOM according to an embodiment. In block 602, context parameters from sub-systems are received via an API wrapper. In block 604, an analysis kernel is launched. In block 606, the analysis process may be run manually or by preprogrammed instructions. In manual run operations, the user loads files from memory (block 608). In automatically programmed operations, the interface control and analysis computing device loads files and initiates analysis (block 610). In block 612, file parameters are loaded for calibration and metadata payload. In block 614, an operator or an artificial intelligence engine selects a region of interest from a captured image of a sample specimen. In block 616, artificial intelligence super resolution data may be applied to the region of interest image. In block 618, data about the region of interest is sent to cloud workers for AI-based super resolution of the region of interest image. In some embodiments, output data from the cloud may be received (block 622). A fast Fourier Transform (FFT) may be applied to the data (block 620). In block 624, frequencies of interest from the FFT may be selected. In some embodiments, AI worker services may be imported from the Cloud (block 626). In block 628, an inverse fast Fourier Transform may be run on the data. In block 630, a quadrature function may be run on the data resulting from the inverse FFT. In block 632, frequencies of interest from the FFT may be selected from the data after the quadrature function is applied. In block 634, an inverse fast Fourier Transform may be run on the selected frequency data. In block 636, two phase images may be subtracted as is performed in generating holography. In block 638, a modulate function is run. In block 640, another FFT is run on the resultant data. In block 642, frequencies of interest from the FFT may be selected. In block 644, an inverse fast Fourier Transform may be run on the data. In block 646, a quadrature function may be run on the data resulting from the inverse FFT. To reconstruct the 3D image, from block 646 two data sets of 3D geometry called 'Phase unwrap' may be generated resulting in the residual stress strain 'Phase to strain'. In some embodiments, the phase may be unwrapped (block 648). In some embodiments, a phase strain function may be applied (block 650). In block 652, discontinuities may be eliminated. In block 654, the data product output may be sent for recording, plotting, 3D visualization, and A.I. training. At block 656, the analysis ends.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

Some embodiments of processes disclosed above may be in the form of program modules that generally carry out the functions and/or methodologies. In some embodiments, the interface control and analysis station 70 includes a computing device capable of operating the program modules. The computing device may typically include a variety of computer system readable media. Such media could be chosen from any available media that is accessible including non-transitory, volatile and non-volatile media, removable and non-removable media for use by or in connection with an instruction execution system, apparatus, or device. The system memory could include one or more computer system readable media in the form of volatile memory, such as a random-access memory (RAM) and/or a cache memory.

What is claimed is:

1. A digital holographic optical microscope system for nanoscale imaging, comprises:
   a microscope;
   a camera sensor coupled to the microscope and positioned to capture images of objects within the field of view of an objective on the microscope;
   a first optical grating positioned within the field of view of the microscope;
   a microscope slide holding a sample specimen adjacent the first optical grating, wherein the microscope slide and the first optical grating meet at a first interface;
   a second optical grating positioned on a side of the microscope slide opposite the first optical grating, wherein the microscope slide and the second optical grating meet at a second interface;
   a light source positioned to illuminate the field of view of the microscope;
   a first pumped laser and polarized output pointed at the first interface, wherein a critical angle of incidence of the first pumped laser and polarized output on the first interface is greater than a critical angle of the first interface;
   a second pumped laser and polarized output pointed at the second interface, wherein a critical angle of incidence of the second pumped laser and polarized output on the second interface is greater than a critical angle of the second interface;
   a motorized stage supporting the first optical grating, the microscope slide, and the second optical grating; and
   an interface control system coupled to the motorized stage and the camera sensor, including a computing device configured to:
      control a movement of the motorized stage to position the microscope slide and sample specimen within a plurality of adjusted positions within the field of view of the microscope;
      receive image data from one or more evanescent wavefronts in images captured by the camera sensor;
      interpret the image data using a Moiré holographic analysis;
      reconstruct a three-dimensional image of the interpreted image data;
      run a prediction engine on the three-dimensional image; and
      identify features in the sample specimen using the prediction engine.

2. The digital holographic optical microscope system of claim 1, wherein the second optical grating is doped.

3. The digital holographic optical microscope system of claim 1, further comprising an edge sensor coupled to the microscope and configured to detect the one or more evanescent wavefronts in the field of view.

4. The digital holographic optical microscope system of claim 1, wherein the interface control system is configured to optimize an optical path to the sample specimen.

5. The digital holographic optical microscope system of claim 1, further comprising an artificial intelligence (A.I.) engine coupled to the interface control system, wherein the A.I. engine is configured to identify dislocations in the sample specimen.

6. The digital holographic optical microscope system of claim 1, wherein the first optical grating is a Ronchi ruling.

* * * * *